United States Patent
Storm et al.

(10) Patent No.: US 10,486,920 B2
(45) Date of Patent: Nov. 26, 2019

(54) TRANSFER SYSTEMS FOR RECEIVING AND CONVEYING MATERIAL

(71) Applicant: Vermeer Manufacturing Company, Pella, IA (US)

(72) Inventors: Brandon Storm, Pella, IA (US); Nathan Meyer, Knoxville, IA (US); Gregory Anderson, Pella, IA (US); Markus Terry, Pella, IA (US); Joshua Seibert, West Fargo, ND (US)

(73) Assignee: Vermeer Manufacturing Company, Pella, IA (US)

( * ) Notice: Subject to any disclaimer, the term of this patent is extended or adjusted under 35 U.S.C. 154(b) by 84 days.

(21) Appl. No.: 15/702,547

(22) Filed: Sep. 12, 2017

(65) Prior Publication Data

US 2018/0072516 A1     Mar. 15, 2018

Related U.S. Application Data

(60) Provisional application No. 62/393,151, filed on Sep. 12, 2016, provisional application No. 62/452,706, filed on Jan. 31, 2017.

(51) Int. Cl.
    *B65G 67/24*          (2006.01)
    *B65G 15/30*          (2006.01)
    (Continued)

(52) U.S. Cl.
    CPC ......... *B65G 67/24* (2013.01); *B01D 33/0346* (2013.01); *B01D 33/04* (2013.01); *B65D 90/54* (2013.01); *B65G 15/30* (2013.01); *B65G 65/42* (2013.01); *B65G 69/287* (2013.01); *C02F 11/121* (2013.01); *C02F 11/123* (2013.01); *F26B 17/023* (2013.01); *F26B 17/04* (2013.01);
    (Continued)

(58) Field of Classification Search
    CPC ............ B65G 69/2811; B65G 69/2817; B65G 69/2823; B65G 69/287; B65G 67/24; B65D 90/623; B65D 90/64; B65D 90/66; E05D 7/02; E06B 7/30; E06B 7/32; B65B 19/14; B65B 35/24
    USPC .................................. 49/303, 169, 171, 248
    See application file for complete search history.

(56) References Cited

U.S. PATENT DOCUMENTS 2,251,990 A * 8/1941 De Young ............ B65D 90/587
                                                           198/530
3,074,369 A * 1/1963 Luketa .................... B63B 19/14
                                                           114/201 R (Continued)

OTHER PUBLICATIONS

Waste + Water Management Australia, "Vac Group: An Australian Success Story" (Oct. 2016), 2 pgs.

(Continued)

*Primary Examiner* — Glenn F Myers
(74) *Attorney, Agent, or Firm* — Armstrong Teasdale LLP

(57) ABSTRACT

Transfer systems for receiving and conveying material such as earthen slurries discharged from vacuum excavators are disclosed. The transfer system may include a holding tank and a conveyor such as a drag-slat conveyor that extends into the tank to remove and convey material from the tank. The transfer system includes a hatch. The hatch is moveable from a closed position in which vehicles travel over the hatch to an open position in which the holding tank is open to receive material from the vacuum excavator.

22 Claims, 20 Drawing Sheets

(51) Int. Cl.

| | | |
|---|---|---|
| *C02F 11/123* | (2019.01) | |
| *F26B 17/02* | (2006.01) | |
| *B65D 90/54* | (2006.01) | |
| *B65G 65/42* | (2006.01) | |
| *B65G 69/28* | (2006.01) | |
| *F26B 17/04* | (2006.01) | |
| *B01D 33/03* | (2006.01) | |
| *B01D 33/04* | (2006.01) | |
| *C02F 11/121* | (2019.01) | |
| *C02F 11/14* | (2019.01) | |

(52) U.S. Cl.
CPC ........ *B01D 2201/089* (2013.01); *C02F 11/14* (2013.01); *C02F 2201/008* (2013.01); *C02F 2301/08* (2013.01); *Y02W 30/32* (2015.05)

(56) References Cited

U.S. PATENT DOCUMENTS

| | | | | |
|---|---|---|---|---|
| 3,378,152 A | * | 4/1968 | Warner | B65G 47/18 |
| | | | | 198/582 |
| 3,417,883 A | * | 12/1968 | Felts | B65F 9/00 |
| | | | | 414/303 |
| 3,606,050 A | * | 9/1971 | Silver | B65G 69/30 |
| | | | | 198/607 |
| 3,802,584 A | * | 4/1974 | Sackett, Sr. | B65G 19/16 |
| | | | | 198/535 |
| 5,964,566 A | | 10/1999 | Stewart et al. | |
| 6,668,487 B2 | * | 12/2003 | Vesey | E06B 7/32 |
| | | | | 119/501 |
| 6,966,740 B2 | | 11/2005 | Mast et al. | |
| 7,198,318 B2 | * | 4/2007 | Dilluvio | B60J 7/145 |
| | | | | 296/107.08 |
| 8,397,902 B1 | | 3/2013 | Geraets | |
| 8,684,161 B2 | | 4/2014 | Gausman et al. | |
| 10,017,097 B2 | * | 7/2018 | Ozinga | B65G 21/10 |
| 2010/0200514 A1 | | 8/2010 | Crocker | |
| 2014/0190356 A1 | | 7/2014 | Barrett et al. | |
| 2015/0360856 A1 | | 12/2015 | Oren et al. | |
| 2017/0028366 A1 | | 2/2017 | Pullman et al. | |
| 2018/0086655 A1 | | 3/2018 | Malcolm | |

OTHER PUBLICATIONS

Kringstad Ironworks, Inc., "Beet Piler Catalog: End Dumps" (2009), 1 pg.

Lee and Tracy, "First Time at the Beet Harvest—Days 5 through 6", Camper Chronicles (Oct. 5, 2016), 17 pgs.

"North Dakota Sugar Beet Bulk Storage Operation—Beet Piling" (Oct. 30, 2012), https://www.youtube.com/watch?v=cVjdx5oNTgA; Scholl, J.

* cited by examiner

TRANSFER SYSTEMS FOR RECEIVING AND CONVEYING MATERIAL

CROSS-REFERENCES TO RELATED APPLICATIONS

The present application claims the benefit of U.S. Provisional Patent Application No. 62/393,151, filed Sep. 12, 2016 and U.S. Provisional Patent Application No. 62/452,706, filed Jan. 31, 2017, each of which is incorporated herein by reference in its entirety.

FIELD OF THE DISCLOSURE

The field of the disclosure relates to transfer systems for receiving and conveying material such as earthen slurries discharged from vacuum excavators.

BACKGROUND

Various subsurface infrastructure such as power cables, water lines, gas lines, and product piping may be installed by drilling operations. Horizontal directional drilling is a trenchless drilling technique often used in urban areas and for crossing below roads or waterways. Drilling involves formation of a pilot hole along the drill path. The pilot hole is then reamed out to the size of the utility. During drilling, a viscous drilling fluid that typically contains bentonite or polymer is pumped to the cutting head. The drilling fluid, for example, cools the cutting head and carries drill cuttings away from the drill bore. Spent drilling fluid may be collected by use of vacuum excavators. Such vacuum excavators may also collect fluid from vertical well drilling.

Vacuum excavators are also used in a process commonly referred to as "potholing", "daylighting" or "locating." Potholing involves use of high pressure water that loosens soil to create a hole to visually locate utilities. The mud slurry that is produced is removed by a vacuum and sent to a spoil tank. High pressure systems may also be used to cut trenches with the resulting slurry being sent to a spoil tank of a vacuum excavator. Vacuum excavators may also be used to remove water/mud slurries from valve and meter boxes to provide access to the boxes.

The raw slurry produced during drilling or potholing, typically collected by vacuum excavators, is conventionally landfilled or dumped at a designated disposal site. Landfill disposal of slurries containing a large amount of water may be relatively expensive compared to disposal of solids alone. Further, tightening regulations may limit disposal options for such slurries.

A need exists for transfer systems that receive earthen slurries from vacuum excavators and that are capable of receiving and conveying earthen slurries with a high solids content and/or relatively large solids. A need exists for systems that allow the material to be removed from the dumping station and elevated vertically to allow the material to be processed in downstream operations. A need exists for systems and methods that allow slurries to be dumped with ease and that allow for multiple loads to be dumped while processing slurries.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a transfer system for receiving and conveying material from transport vehicles. The transfer system includes a holding tank and a hatch movable between a closed position in which a holding tank opening is covered and an open position in which the holding tank opening is uncovered. The hatch has a drive-over surface. One or more frame members extend across the holding tank opening to support vehicles that move across the drive-over surface. A conveyor extends into the holding tank to remove material from the holding tank. The conveyor has a top course and a bottom course. The conveyor top course and bottom course are disposed below the frame member.

Another aspect of the present disclosure is directed to a dumping station for receiving material from a transport vehicle. The dumping station includes a holding tank for receiving material discharged from a vehicle. The holding tank has a first sidewall and a second sidewall. The holding tank has a longitudinal axis generally parallel to the first and second sidewalls. A drive-over surface is disposed above the holding tank. The dumping station includes a first frame member for supporting vehicles which move across the drive-over surface. The frame member is orthogonal to the longitudinal axis. The dumping station includes a second frame member for supporting vehicles which travel over the drive-over surface. The second frame member is orthogonal to the longitudinal axis.

Yet another aspect of the present disclosure is directed to a dumping station for receiving material from a transport vehicle. The dumping station has a longitudinal axis. The dumping station includes a holding tank and a hatch movable between a closed position in which a holding tank opening is covered and an open position in which the holding tank opening is uncovered. The dumping station includes an actuator assembly for moving the hatch between the open position and the closed position. The dumping station includes a frame having a first mount system for connecting the actuator assembly. The hatch moves in a first direction as it moves from the closed position to the open position when the actuator assembly is connected to the first mount system. The first direction is transverse to the longitudinal axis. The frame has a second mount system for connecting the actuator assembly. The hatch moves in a second direction as it moves from the closed position to the open position when the actuator assembly is connected to the second mount system. The second direction is transverse to the longitudinal axis.

Yet a further aspect of the present disclosure is directed to a dumping station for receiving material from a transport vehicle. The dumping station includes a holding tank and a hatch having a width. The hatch is movable between a closed position in which a holding tank opening is covered and an open position in which the holding tank opening is uncovered. The holding tank opening has a width created when the hatch is in the open position. The hatch moves within an area that extends vertically above the width of the holding tank opening as the hatch moves from the open position to the closed position. The area has a maximum height. A ratio of the maximum height of the area to the width of the hatch is less than about 0.33. The dumping station includes an actuator assembly for moving the hatch between the open position and the closed position.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
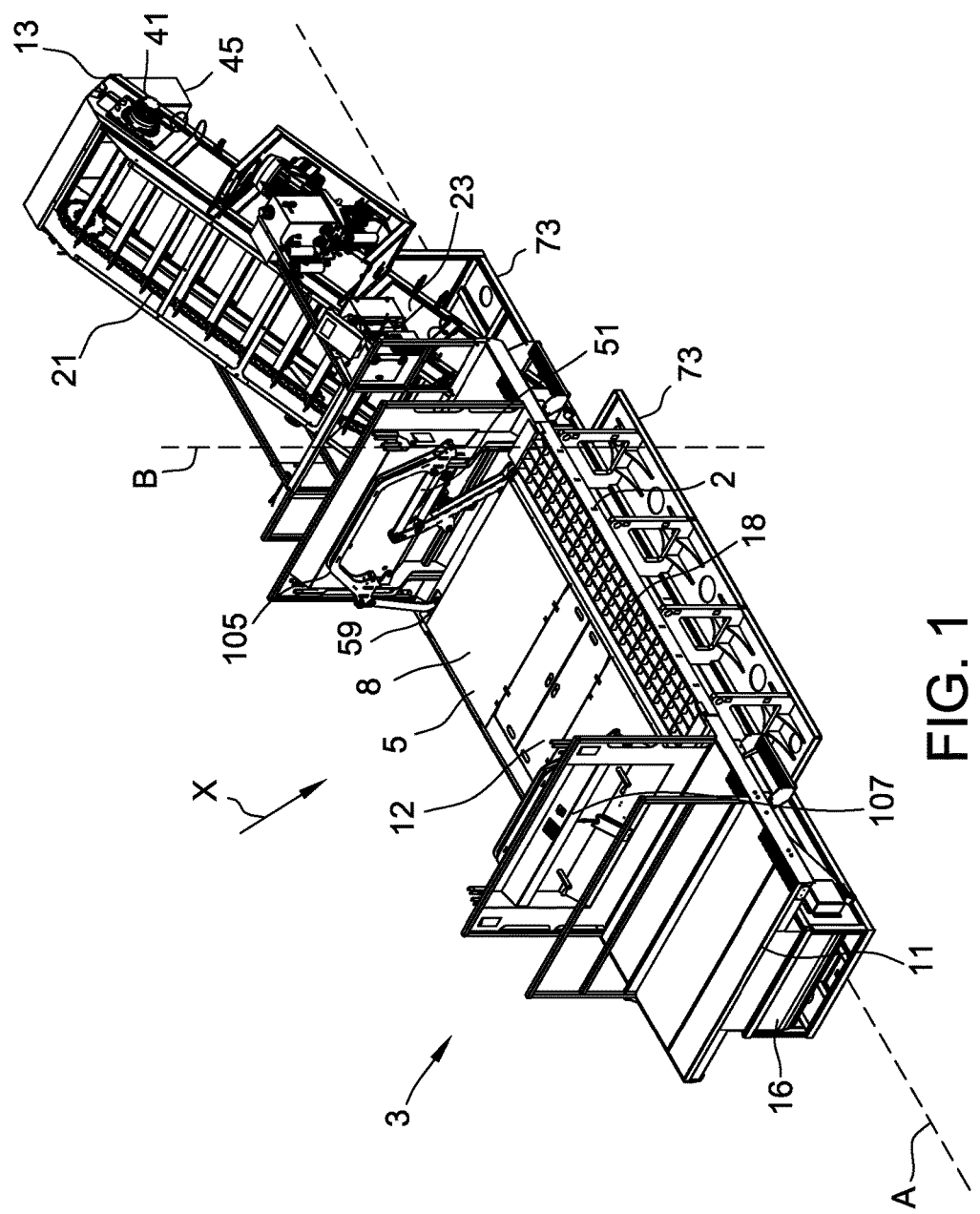
FIG. 1 is a perspective view of a transfer system for receiving and conveying material with a hatch in a closed position.

A transfer system 3 for receiving and conveying material is shown in FIG. 1. The system 3 includes a dumping station 2 to receive material from a transport vehicle and a conveyor 21 to transport the material from the dumping station 2. In some embodiments, the system is configured to receive earthen slurries. In this regard, the earthen slurry may be transported and offloaded from vehicles known in the art as vacuum excavators and, particularly, hydro excavators. The earthen slurry that is processed may be any mixture of liquid and solids that is transported to the system by a transport vehicle. In some embodiments, the slurry comprises earth and water such as cuttings from a drill site (vertical drill or horizontal drill site) or from potholing, hydro-excavation trenching and/or from other excavation or mining sites in which earthen solids and water are involved. The earthen slurry may include water and earth that was loosed during drilling/potholing or a mining operation. The slurry may also include various additives that are added to the water for drilling purposes (e.g., to modify the viscosity of the fluid) such as bentonite and/or polymers. The slurry may include 0% solids or more, at least about 10% solids, at least about 30% solids or even at least about 50% solids (e.g., from about 0% to about 70% solids or from about 10% to about 70% solids). In other embodiments, the transfer system 3 is configured to receive and convey other types of material that is processed in conveying operations such as particulates such as grain and aggregate material.

The transfer system 3 includes a first end 11, a second end 13, and a longitudinal axis A that extends through the first end 11 and second end 13. The second end 13 is the discharge end of the conveyor 21.

The dumping station 2 may be buried at a site such that the drive-over surface 8 is generally level with the ground when the hatch 5 is in the down position. In other embodiments, the dumping station 2 may include ramps to allow vehicles to travel over the dumping station 2. Alternatively, earthen ramps may be formed to allow vehicles to travel over the dumping station 2. The dumping station 2 is configured to receive slurry after driving a vehicle over the hatch 5 (or reversing a vehicle to the dumping station 2). In some embodiments, the dumping station is also configured to receive material by backing a vehicle up to an end 11 of the system 1. In such embodiments, the end 11 of the dumping station 2 may also include a cover, grate (not shown) or may be open.

The dumping station 2 includes a holding tank 15 (FIG. 2) for containing slurry after dumping. In some embodiments, the holding tank 15 is sized to hold at least about 1,000 gallons of slurry or at least about 1,250 gallons, at least about 1,500 gallons or at least about 1,750 gallons (e.g., from about 1,000 gallons to about 3,000 gallons, from about 1,250 gallons to about 3,000 gallons or from about 1,500 gallons to about 2,500 gallons). In some embodiments, the holding tank 15 is sized to hold the largest load that is conventionally hauled on vacuum excavators such as at least about 3,000 gallons.

Figure 5:
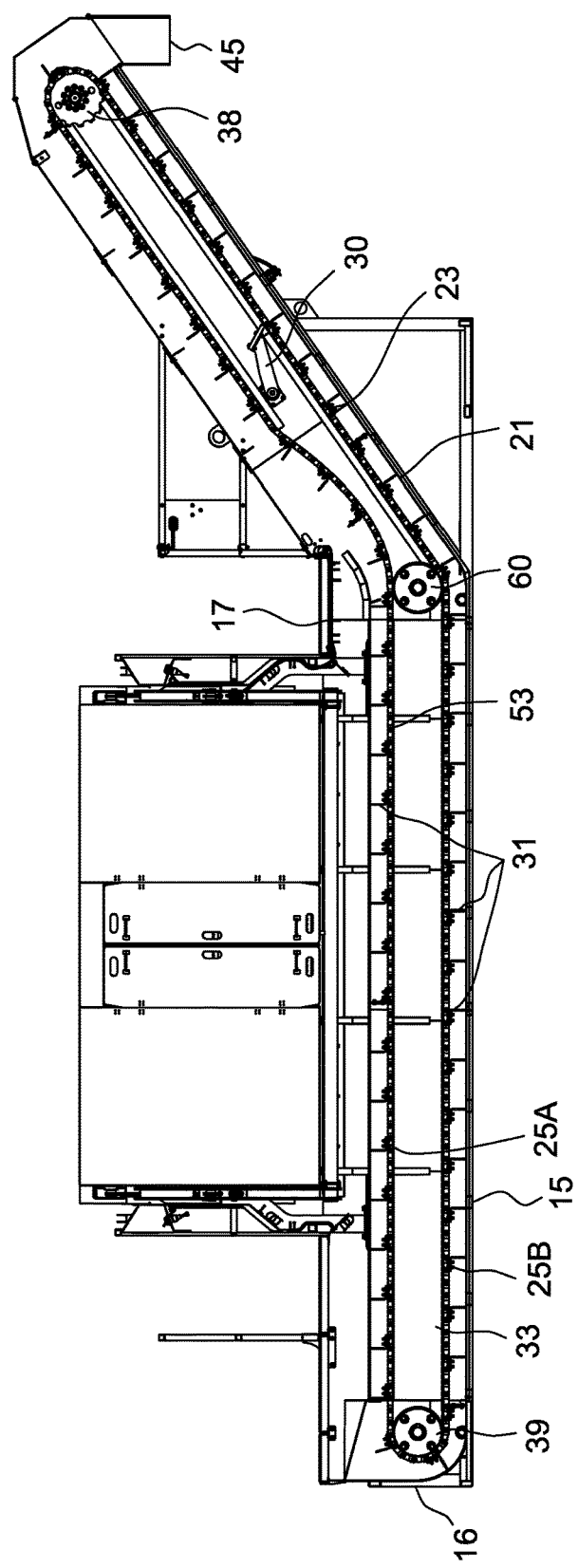
FIG. 5 is a cross-section side view of the transfer system with the hatch in the open position.
Figure 6:
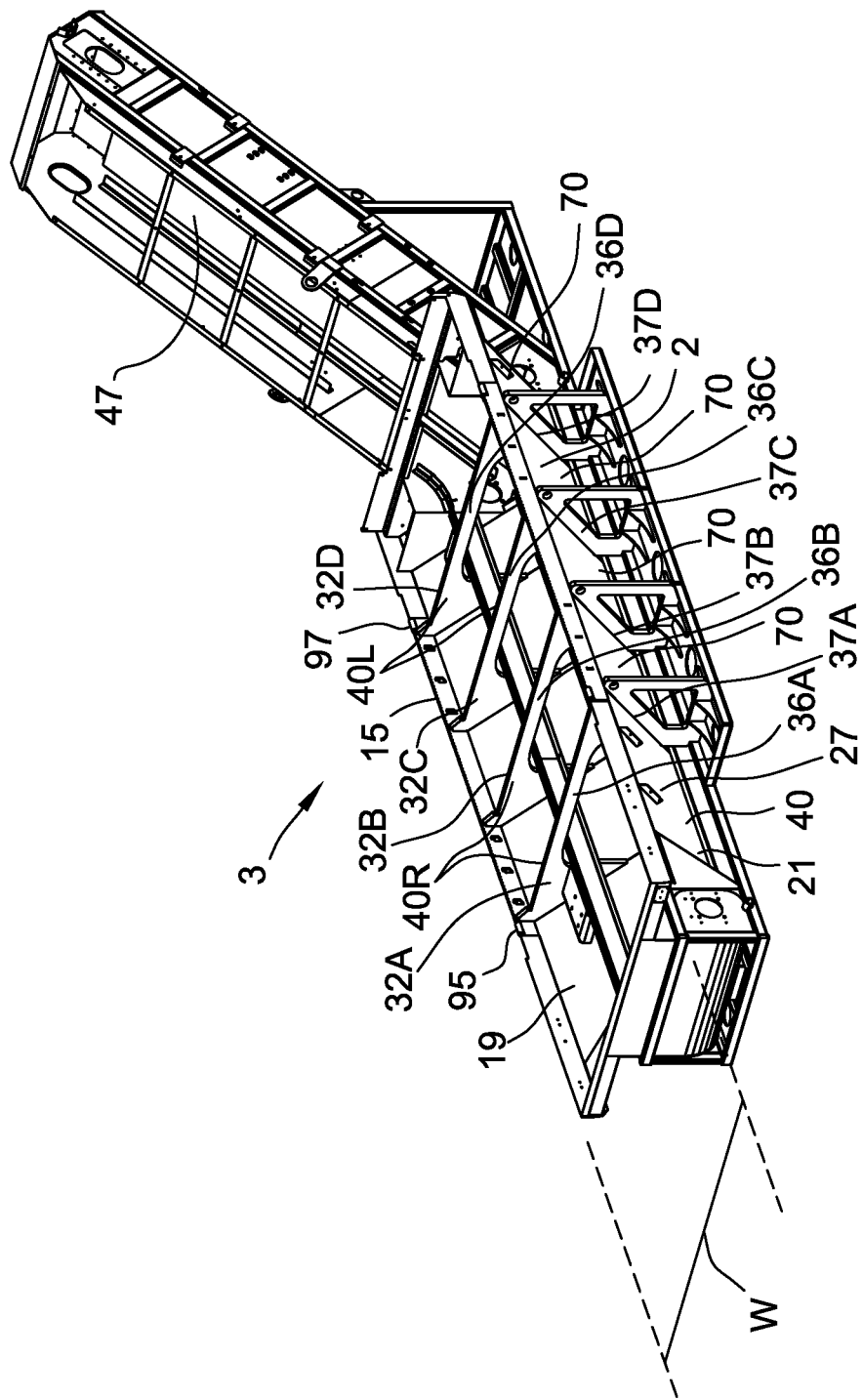
FIG. 6 is a perspective view of a holding tank of the transfer system.
Figure 7:
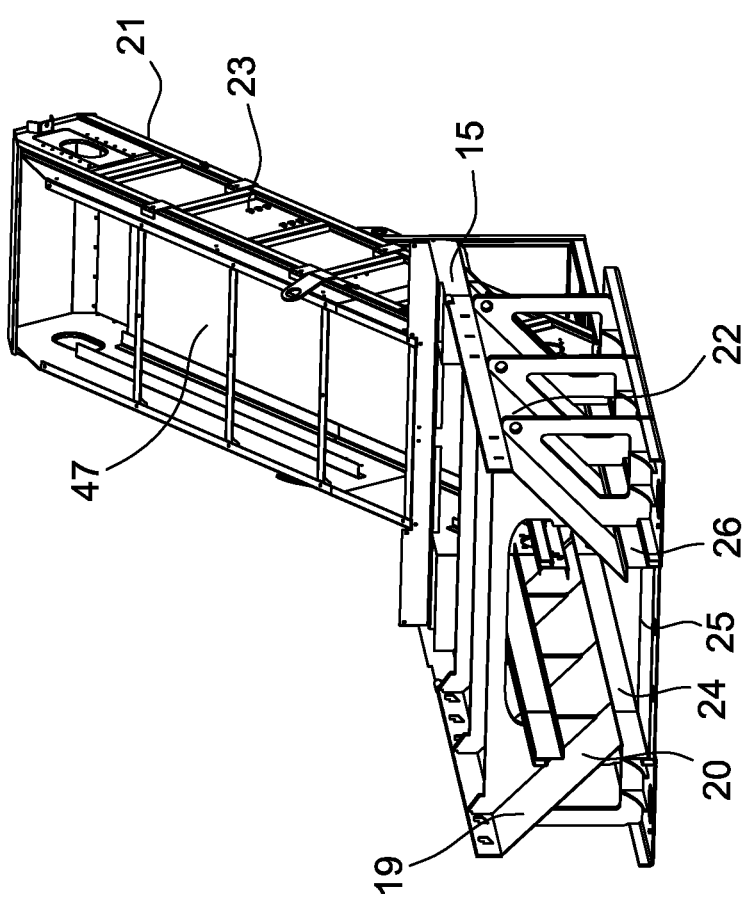
FIG. 7 is a cross-section perspective view of the holding tank.

The holding tank 15 includes first and second sidewalls 19, 27 (FIG. 6). The sidewalls 19, 27 include angular portions 20, 22 (FIG. 7) which taper inward toward the floor 25 of the tank 15. The sidewalls 19, 27 also include vertical portions 24, 26 that extend downward from the angular portions 20, 22. The longitudinal axis A (FIG. 1) of the system 3 extends through a first end 16 (FIG. 5) of the tank 15 and a second end 17.

Figure 2:
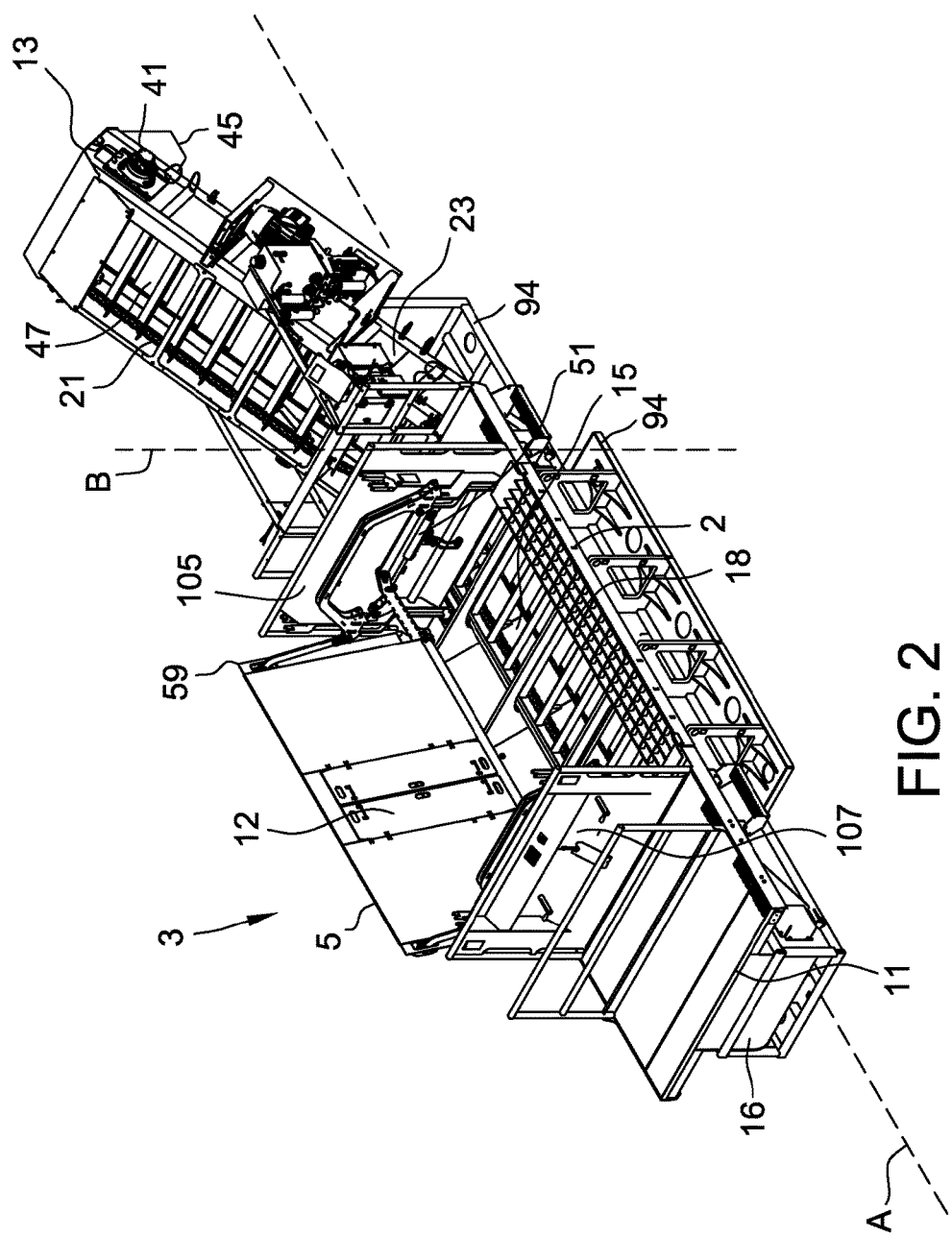
FIG. 2 is a perspective view of the transfer system with the hatch in an open position.

The tank 15 is connected to frame members 32 (FIG. 6) which support a vehicle as it travels over the drive-over surface 8 (FIG. 1) of the dumping station 2. The frame members 32 are transverse to the longitudinal axis A (FIG. 1) and are generally aligned with the direction in which vehicles travel over the dumping station 2. The frame members extend across the holding tank opening 115 (FIG. 2). In the illustrated embodiment, the dumping station 2 includes first, second, third and fourth frame members 32A, 32B, 32C, 32D. In other embodiments, the dumping station 2 may include two, three or more than four frame members.

Figure 8:
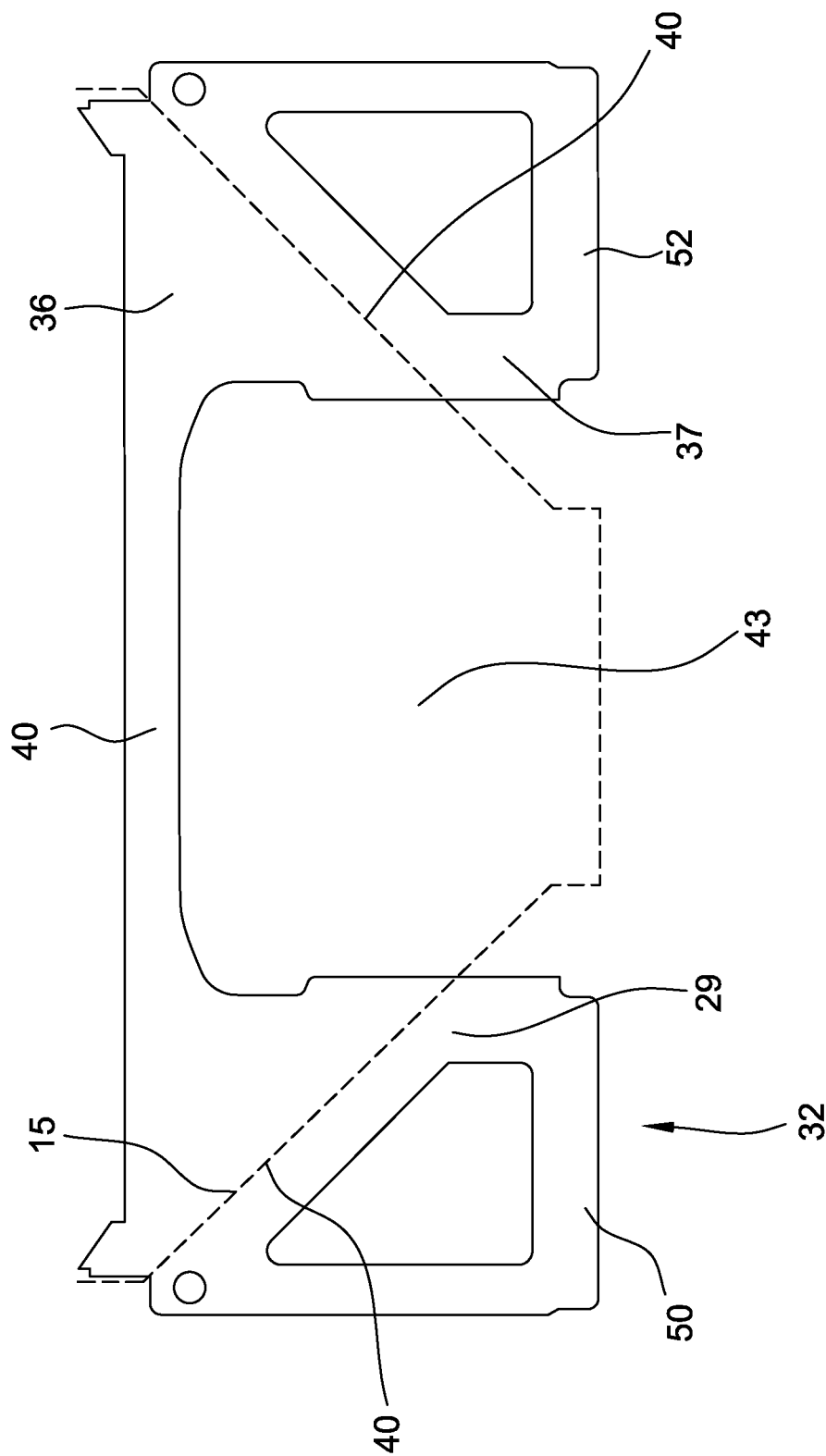
FIG. 8 is a front view of a frame member of a dumping station.

Each frame member 32 (FIG. 8 with the holding tank 15 being shown with dashed lines) includes a first leg 50, a second leg 52 and a spanning portion 40 that extends between the legs 50, 52. The spanning portion 40 extends across at least a portion of the top width W (FIG. 6) of the tank 15. Each frame member 32 includes external portions 29, 37 disposed outside of the tank 15 and an internal portion 36 disposed within the tank 15. The sidewalls 19, 27 of the tank 15 have plates 70 (FIG. 6) that extend between and are connected to the frame members 32 (e.g., by welding) to define the external portions 29, 37 and the internal portion 36 of the frame members 32. The plates 70 are integrally connected together at their lower ends.

In the illustrated embodiment, each frame member 32 is a single part (e.g., the legs 50, 52 and spanning portion 40 form a single weldment). In other embodiments, the frame members 32 include separate components (e.g., separate internal and external portions) that are connected together such as by fasteners or the like.

The frame members 32 may be configured to provide support for the left and right sides of vehicles traveling over the dumping station 2. Generally, vehicles travel over the dumping station 2 in the direction of arrow X (FIG. 1). However, the hatch 5 may be reversibly mounted and trucks may proceed in the opposite direction. The first and second frame members 32A, 32B may form a first drive-on frame 40R to support a vehicle as a first (e.g., right) wheel (or tandem first wheels) travel over the dumping station 2 and a second drive-on frame 40L to support the vehicle as a second (e.g., left) wheel (or tandem second wheels) travel over the dumping station 2.

Figure 9:
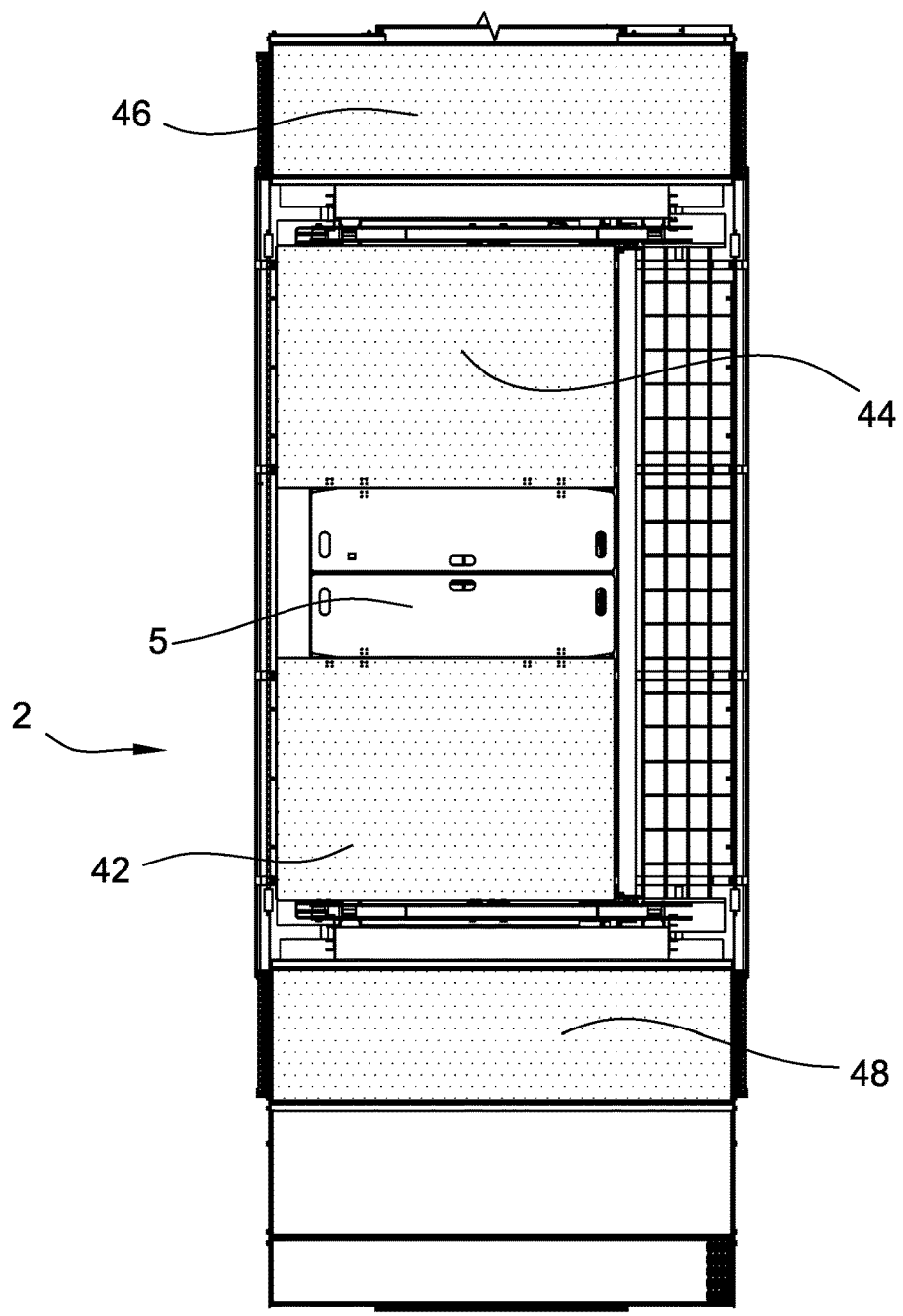
FIG. 9 is a top view of a dumping station of the transfer system with the hatch in the closed position.

Referring now to FIG. 9, the first drive on frame 40R may support a first (e.g., right) wheel drive-on platform 42 (platform area being shown by stippling) between frame members 32A, 32B and the second drive on frame 40L may support a second (e.g., left) wheel drive-on platform 44. The dumping station 2 also includes a first walk-on platform 46 and a second walk-on platform 48. Controls for raising and lowering the hatch 5 may be accessible from one or both walk-on platforms 46, 48.

The dumping station 2 (FIG. 1) includes a hatch 5 that is moveable between a lowered or closed position in which vehicles may travel over the dumping station 2 and a raised or open position (FIG. 2) in which the tank 15 is at least partially uncovered to receive material from a vehicle. Together, the hatch 5, while in the closed position, and a grate 18 form a drive-over surface 8 over which vehicles travel to dump material.

Figure 4:
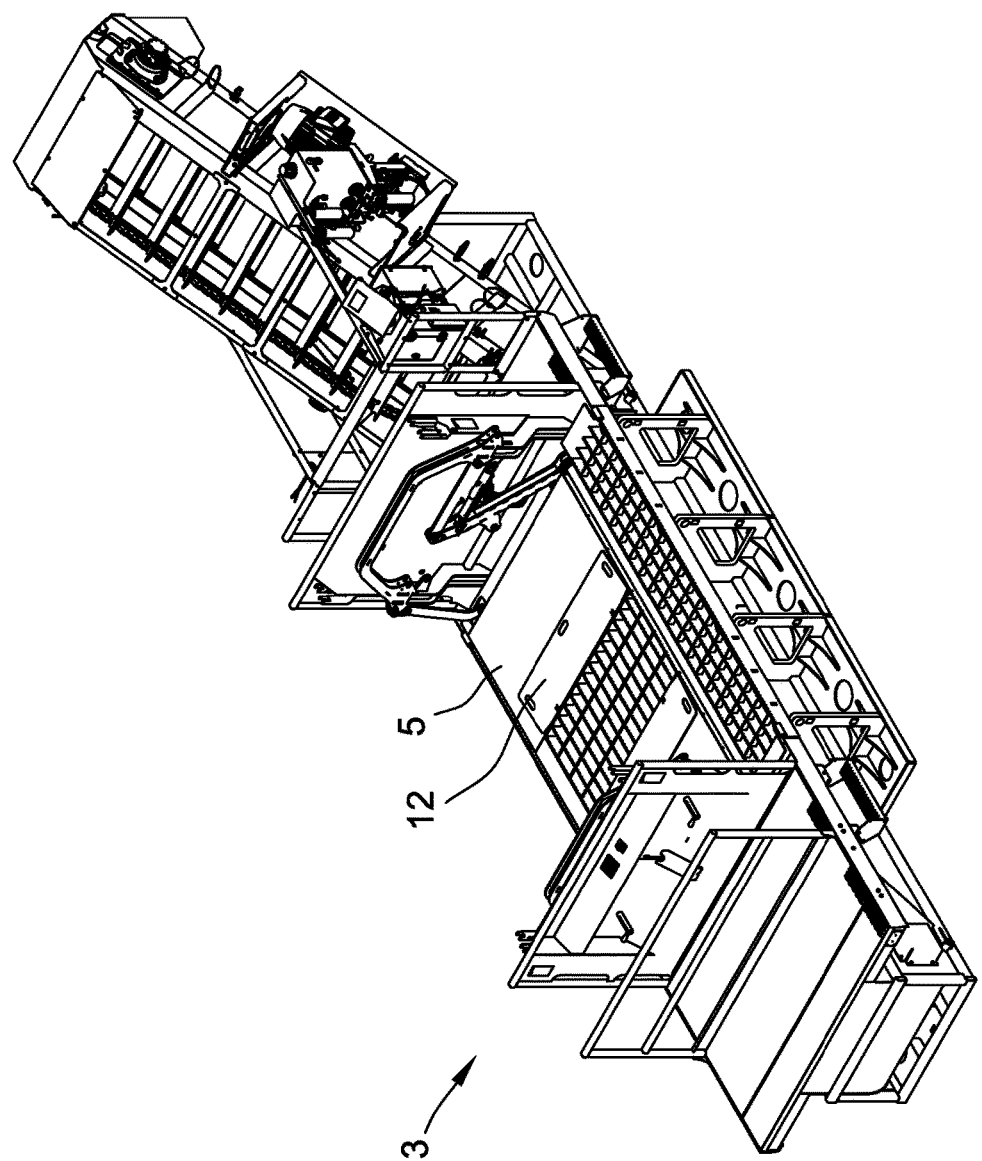
FIG. 4 is a perspective view of the transfer system with the hatch in a closed position and with doors disposed within the hatch being open.

In the open position, the hatch 5 acts as a splash guard to redirect material into the holding tank 15. The hatch 5 is generally made of one or more solid panels of material to allow the hatch 5 to act as a splash guard in its open position. The hatch 5 includes doors 12 which may be opened by a user as shown in FIG. 4 and as further explained below.

Figure 3:
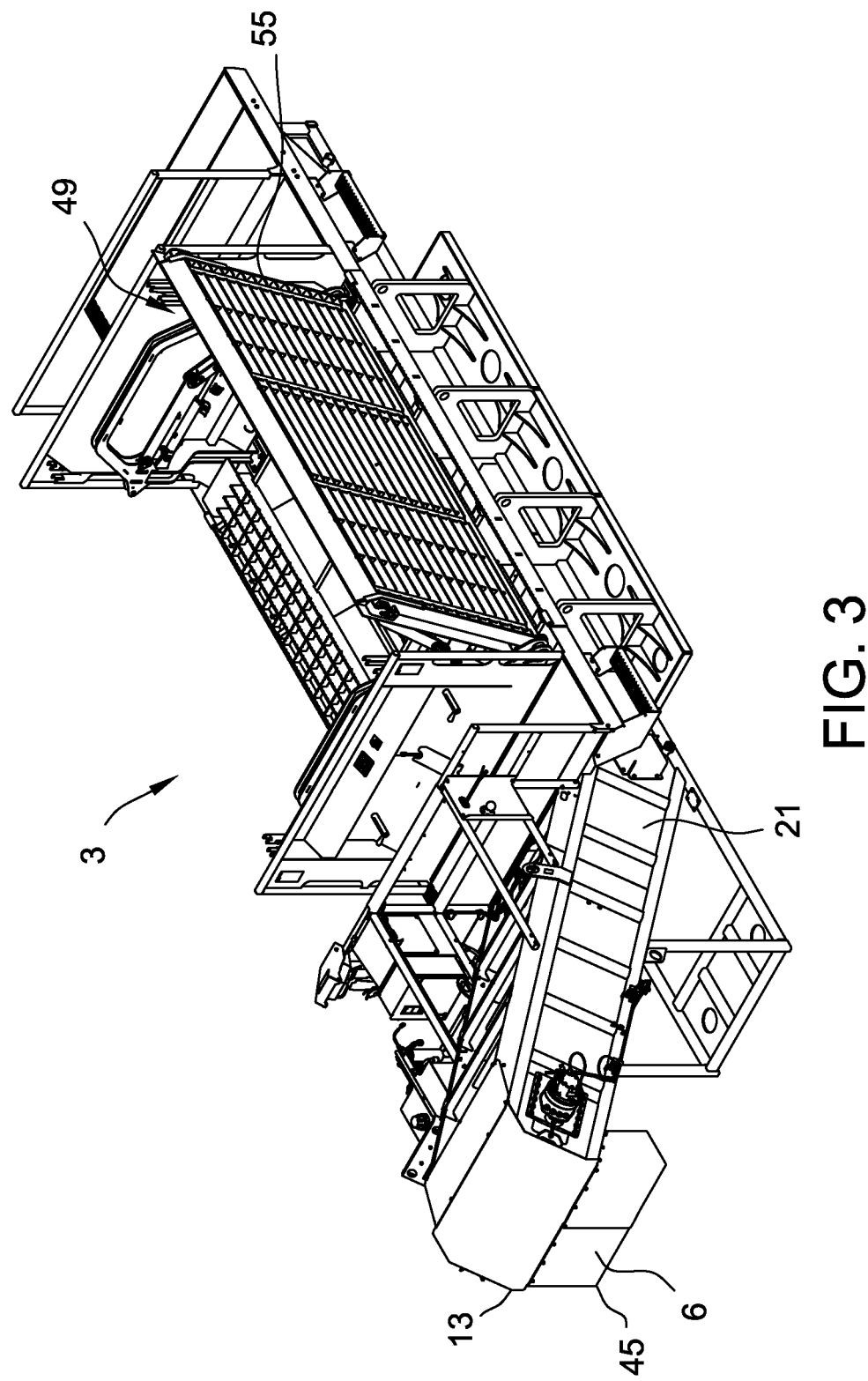
FIG. 3 is another perspective view of the transfer system with the hatch in the open position.

The hatch 5 is moved between the closed and open positions by a first actuator assembly 49 (FIG. 3) connected to a first side 55 of the hatch 5 and a second actuator assembly 51 (FIG. 2) connected a second side 59 the hatch. The actuator assemblies 49, 51 generally include corresponding components and description of one assembly 49, 51 should be understood to also apply to the other assembly.

Figure 10:
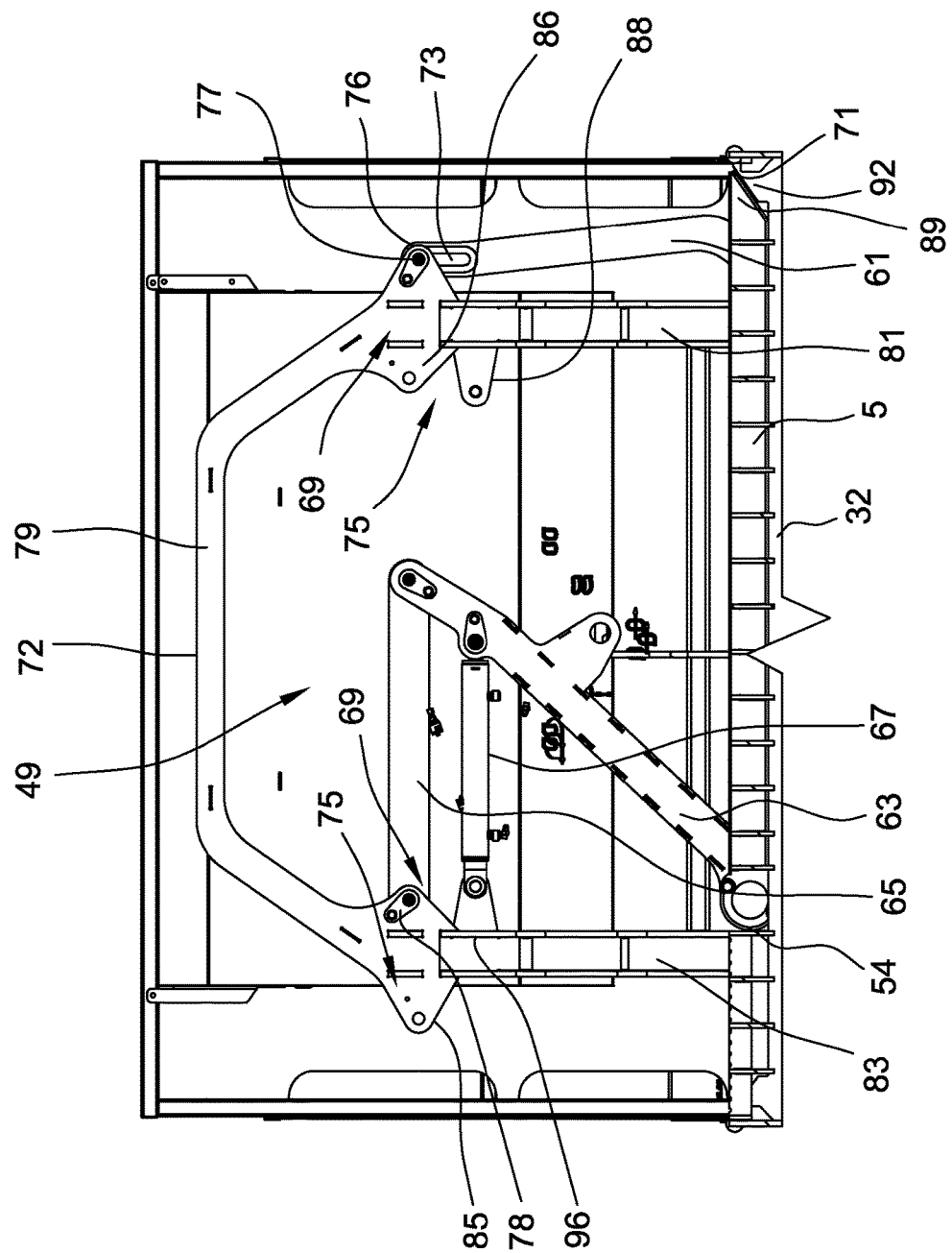
FIG. 10 is a rear cross-section view of the hatch and an actuator assembly for opening and closing the hatch with the hatch in the closed position.

Referring now to FIG. 10, the first assembly 49 includes a first link 61, a second link 63, a third link 65 and an actuator 67. The first actuator assembly 49 is connected to a frame 72. The frame 72 includes a frame crossbar 79 that is connected to first and second frame posts 81, 83.

Figure 12:
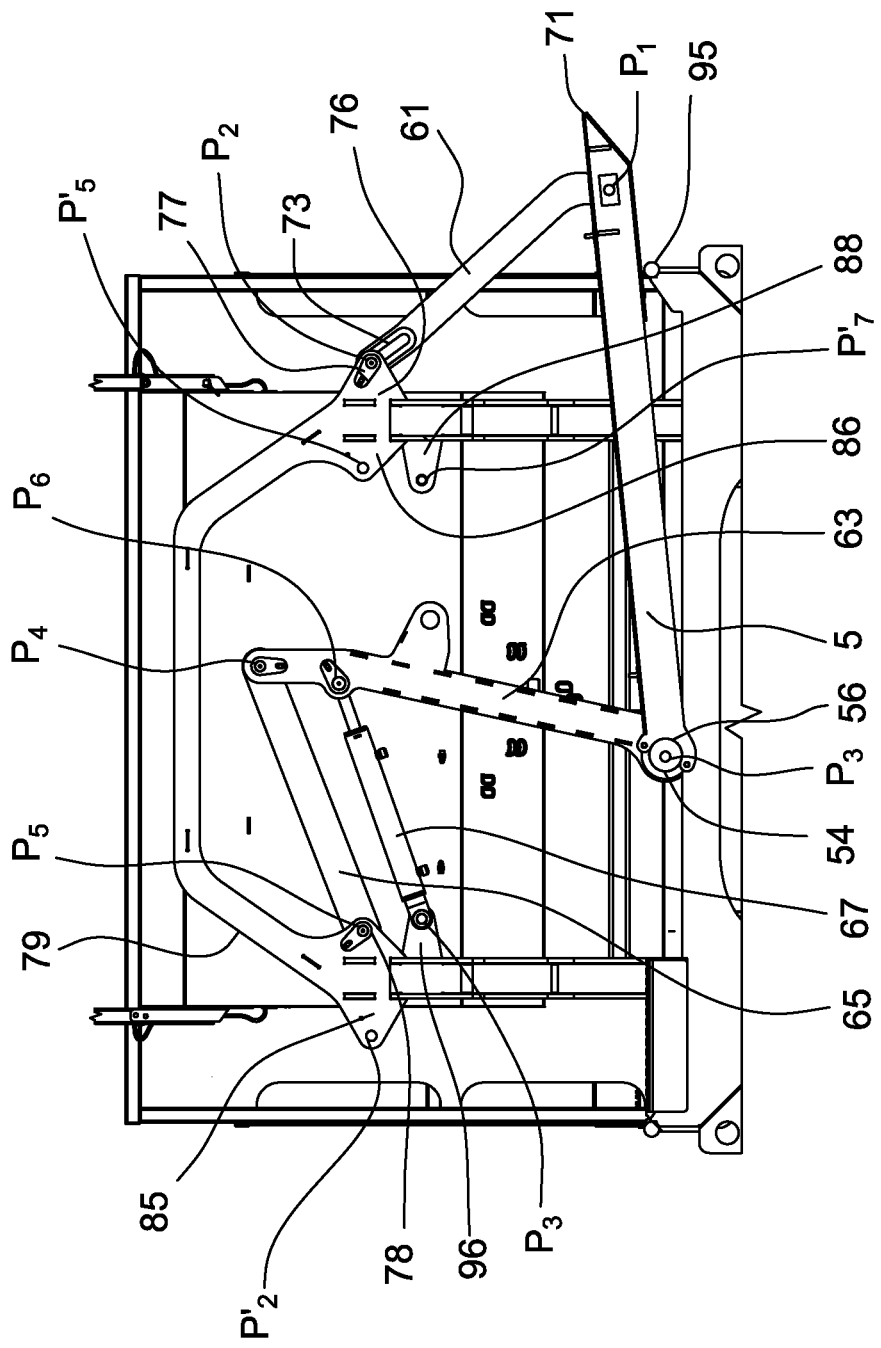
FIG. 12 is a rear cross-section view of the hatch and actuator assembly after the slack has been removed in a first link.

The first link 61 is pivotally connected to the hatch 5 toward the leading end 71 of the hatch 5 at pivot point $P_1$ (FIG. 12). The first link 61 includes a slot 73. A pin 77 connected to the crossbar 79 extends through the slot 73 and bounds movement of the first link 61. The first link 61 moves relative to the pin 77 and pivots about the pin 77 at pivot point $P_2$ when the hatch 5 is moved from the closed to the open position.

The second link 63 is pivotally connected to the hatch 5 toward a trailing end 54 of the hatch 5 at pivot point $P_3$. The second link 63 is also pivotally connected to the third link 65 at pivot point $P_4$. The third link 65 is pivotally connected to the frame crossbar 79 at pivot point $P_5$.

The first actuator assembly 49 includes an actuator 67. In the illustrated embodiment the actuator 67 is a hydraulic cylinder. The actuator 67 is pivotally connected to the second frame post 83 at pivot point $P_6$ and is pivotally connected to the second link 63 at pivot point $P_7$.

Figure 11:
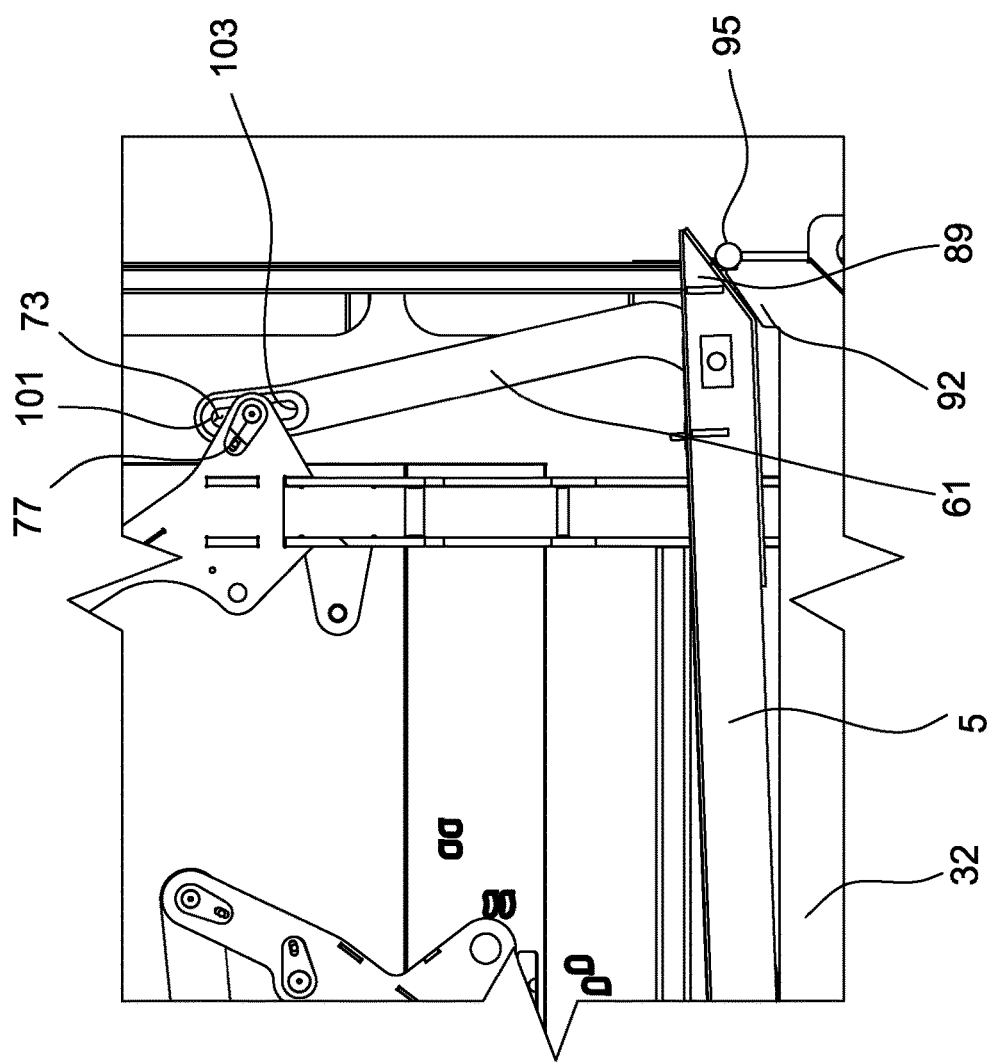
FIG. 11 is a rear cross-section view of the hatch and actuator assembly after the actuator has initially extended.

In the lowered position, the hatch 5 rests on the frame members 32. Generally, the hatch 5 is not supported by the links 61, 63, 65 or actuator 67 in the closed position. To raise the hatch 5 to the open position, the actuator 67 is extended. As the actuator 67 is extended, a tapered portion 89 of the hatch 5 contacts tapered portions 92 of the frame members 32. This causes the hatch 5 to lift as shown in FIG. 11. As the hatch 5 is raised, the trailing end 54 (FIG. 10) of the hatch 5 rides along the frame members 32.

As shown in FIG. 11, the hatch 5 continues to ride along the tapered portions 92 of the frame members 32 and begins to ride on a first bar 95 and a second bar 97 (FIG. 6). As the hatch 5 rises, the slot 73 of the first link 61 takes up the height gain from the hatch 5. The first link 61 moves to cause the first end 101 of the slot 73 to move away from the pin 77 and the second end 103 to move toward the pin 77. As the actuator 67 (FIG. 10) is further extended, the hatch 5 continues to move along the bars 95, 97.

Figure 13:
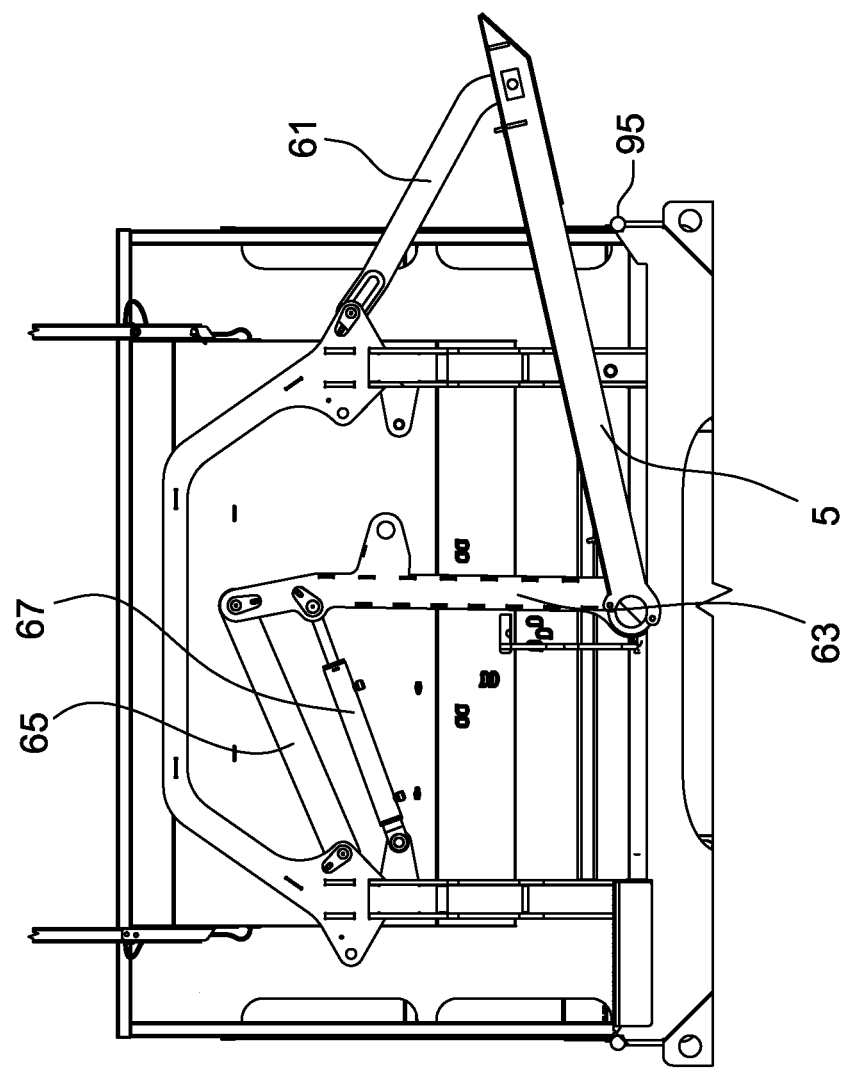
FIG. 13 is a rear cross-section view of the hatch and actuator assembly with the second link being substantially vertical.

As the hatch 5 is further extended, the first end 101 of the slot 73 begins to move toward the pin 77 and the second end 103 away from the pin 77. This continues until the pin 77 contacts the first end 101 of the slot 73 (FIG. 12). The hatch 5 then separates from the bars 95, 97 (FIG. 13).

As shown in FIG. 12, as the actuator 67 is extended, the third link 65 and actuator 67 begin to angle upward from its initial position (FIG. 10). The third link 65 continues to angle upward until the second link 63 is substantially vertical (i.e., with the three pivot points of the second link 63 being vertically aligned as shown in FIG. 13). Further extension of the actuator 67 causes the third link 65 to begin to angle downward.

Figure 14:
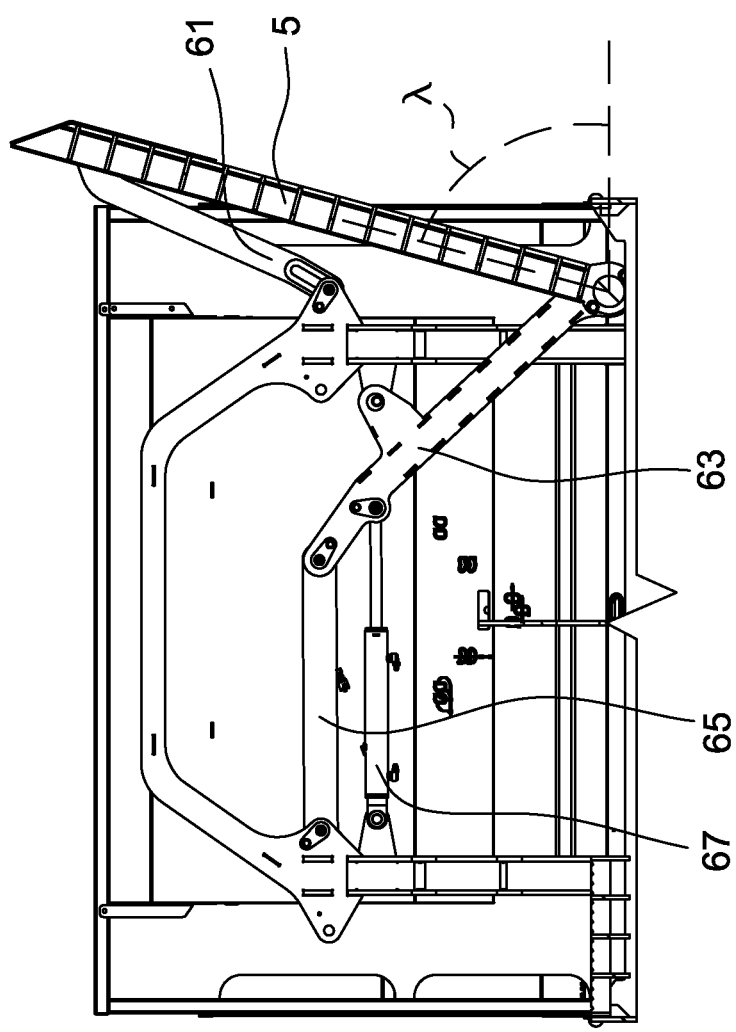
FIG. 14 is a rear cross-section view of the hatch and actuator assembly with the hatch in a partially open position.

As the actuator 67 is fully extended, the hatch 5 moves to the open position (FIG. 14). At the open position of the hatch 5, the third link 65 and actuator 67 are substantially horizontal. To move the hatch 5 back to the closed position, the actuator 67 is retracted and the hatch 5 and links 61, 63, 65 move in the reverse order.

Figure 15:
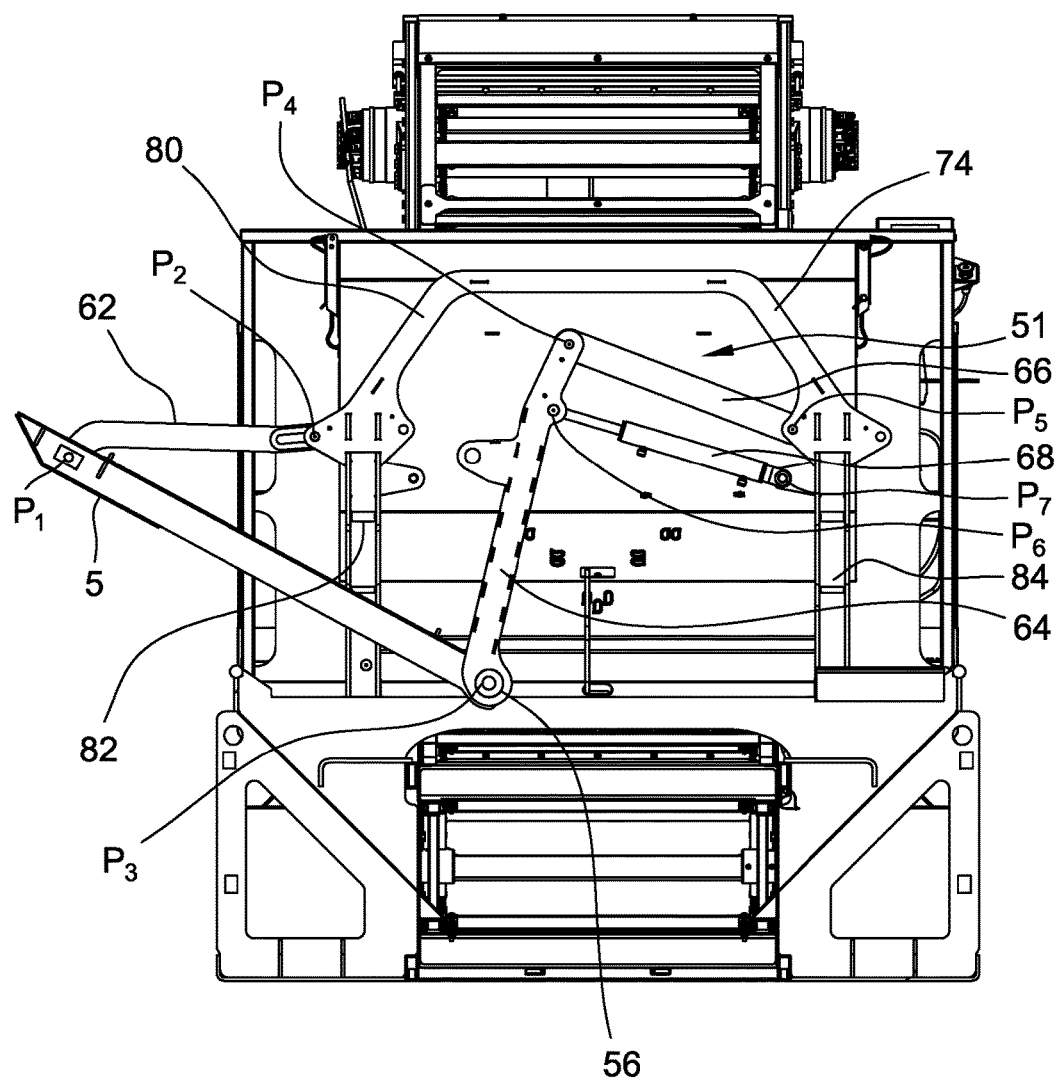
FIG. 15 is a front cross-section view of the hatch and another actuator assembly with the hatch in a partially open position.
Figure 16:
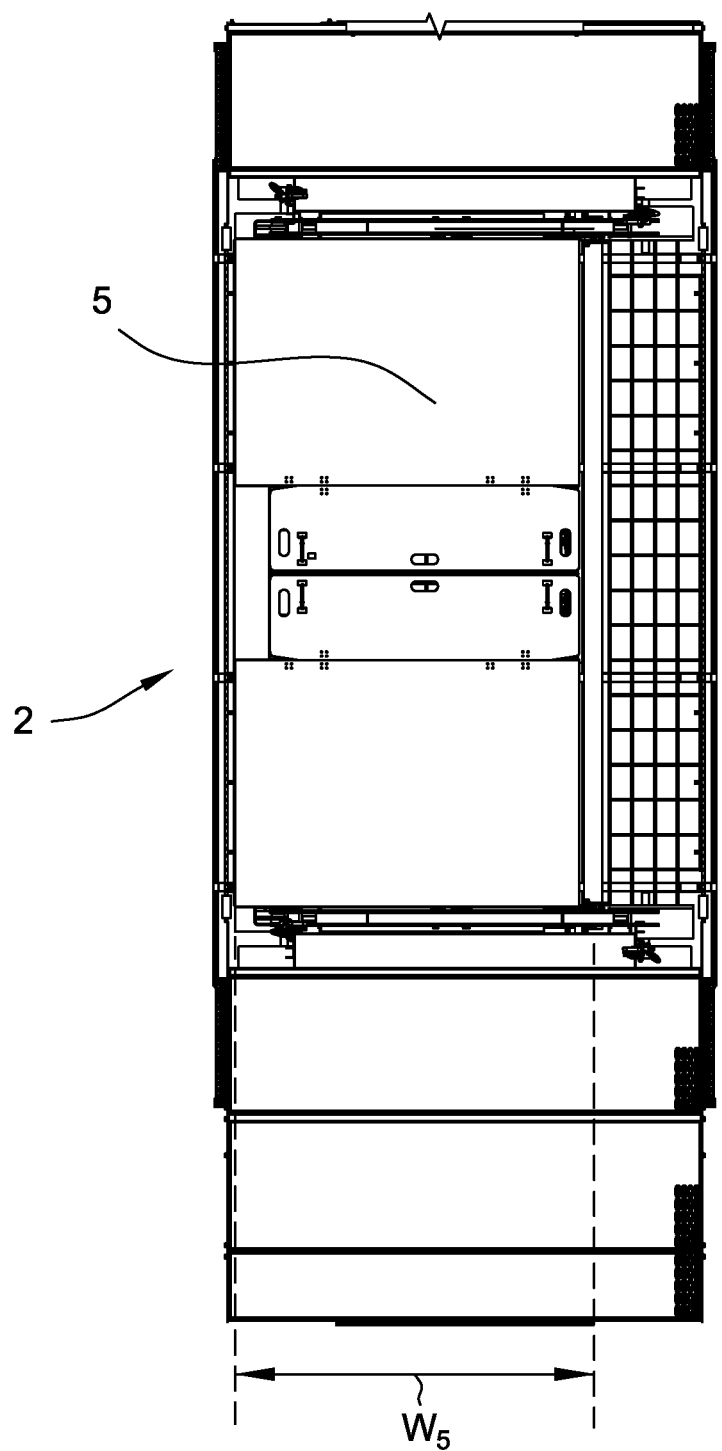
FIG. 16 is a top view of the dumping station with the hatch in the closed position.

The second actuator assembly 51 (FIG. 15) also includes a first link 62, second link 64, third link 66 and actuator 68. The second actuator assembly 51 is connected to a second frame 74 having a frame crossbar 80 connected to first and second frame posts 82, 84. The second actuator assembly includes pivot points $P_1$-$P_7$ which correspond to the pivot points $P_1$-$P_7$ of the first actuator assembly 49.

In the illustrated embodiment, the first links 61, 62 of the first and second actuator assemblies 49, 51 are each connected to a bar 56 (e.g., fixedly connected) which allows the two actuator assemblies 61, 62 to cooperate as the hatch 5 is moved. The hatch 5 pivots about the bar 56.

Referring now to FIG. 10, the frame 72 includes a first mount system 69 for connecting the actuator assembly 49. The first mount system 69 enables the hatch 5 to move in a first direction as the hatch is opened (i.e., toward the first sidewall 19 (FIG. 6)). The first mount system 69 includes a first mounting member 76 for connecting the first link 61 to the frame 72 at pivot point $P_2$ (FIG. 12) a second mounting member 78 for connecting the third link 65 at pivot point $P_5$, and a third mounting member 96 for connecting the actuator 67 at pivot point $P_7$.

As shown in FIG. 10, the actuator assembly 49 is connected to the first mount system 69. The frame 72 also includes a second mount system 75 to which the actuator assembly 49 may be connected. The second mount system 75 enables the hatch 5 to move in a second direction opposite the first direction (i.e., the hatch 5 may be reversibly mounted to move toward the second sidewall 27 (FIG. 6) when opened). The second mount system 75 includes a first mounting member 85 for connecting the first link 61 to the frame 72 at pivot point $P'_2$ (FIG. 12) a second mounting member 86 for connecting the third link 65 at pivot point $P'_5$ (FIG. 12) and a third mounting member 88 for connecting the actuator 67 at pivot point $P'_7$. The second frame 74 (FIG. 15) has corresponding first and second mounts for reversing the direction in which the hatch 5 opens. When the actuator assemblies 49, 51 are connected to the second mount system so as to reverse the direction in which the hatch 5 opens, trucks generally travel over the hatch 5 in a direction opposite the arrow X shown in FIG. 1.

In the open position (FIG. 17), the holding tank 15 is accessible through an opening 115 uncovered by the hatch 5. The opening 115 has a width $W_{115}$ that corresponds to the open portion of the tank 15 that is accessible when the hatch 5 is moved to the fully open position. In some embodiments, the hatch opening 115 is not covered by a grate to allow for generally unrestricted flow of materials into the tank 15.

Figure 17:
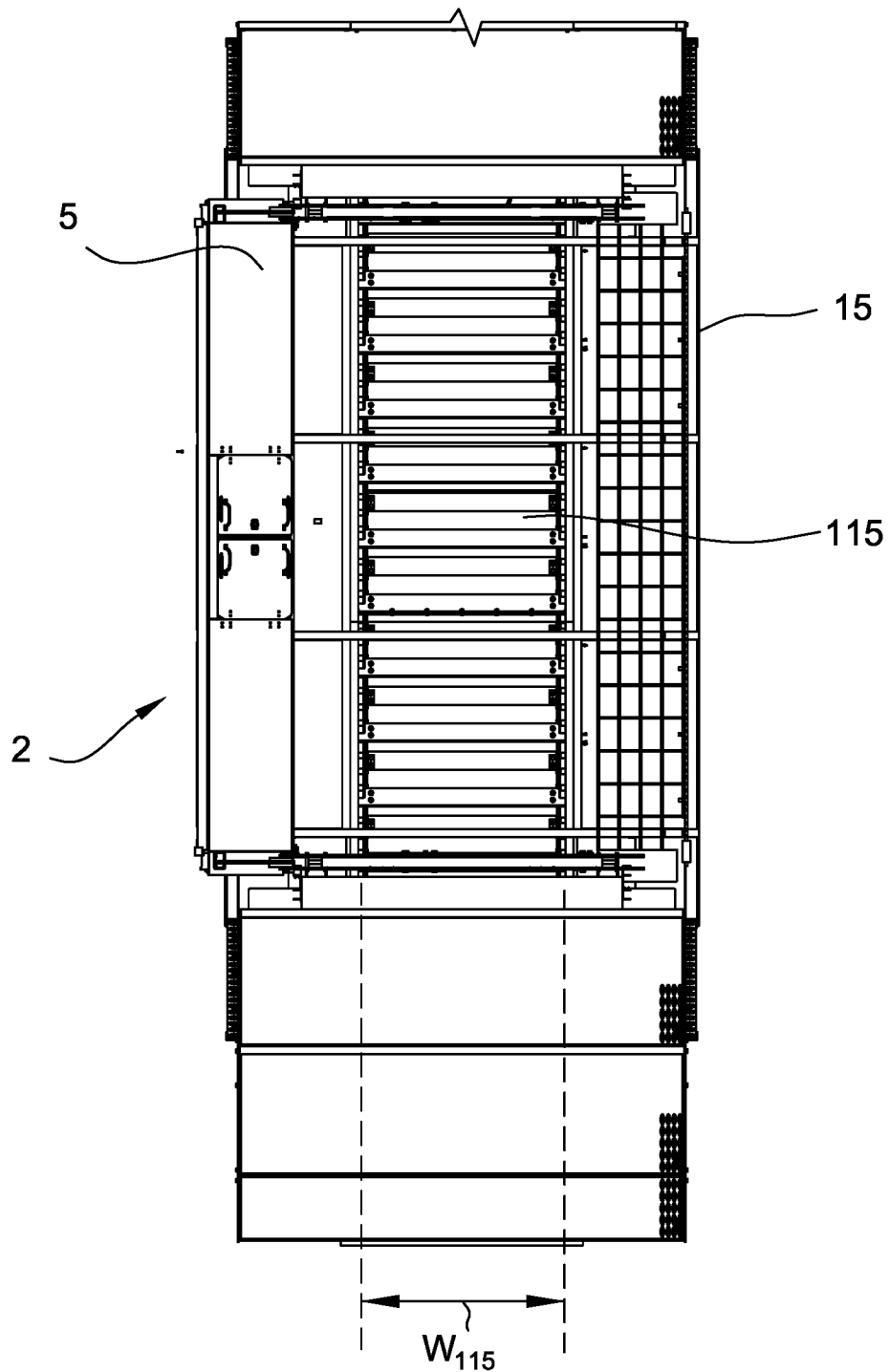
FIG. 17 is a top view of the dumping station with the hatch in the open position.
Figure 18:
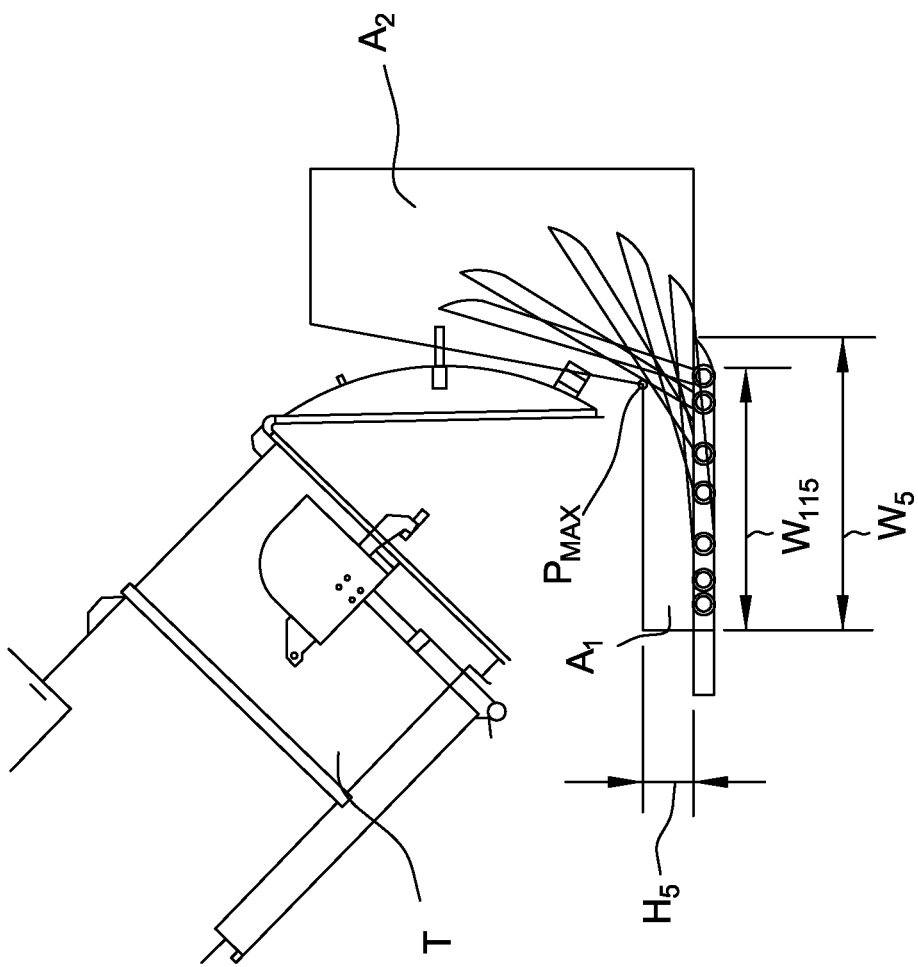
FIG. 18 is a side view of the hatch showing the change in vertical height of the hatch above the hatch opening as the hatch moves from the closed to the open position.

In some embodiments, the links 61, 63, 65 and actuator 67 are configured such that the hatch 5 is bound within a travel path that is initially relatively horizontal. Referring now to FIG. 18, the hatch 5 travels left to right and across the width $W_{115}$ of the tank opening 115 (FIG. 17) (i.e., the width of the opening 115 when the hatch 5 is in the fully open position). As the hatch 5 moves across this width $W_{115}$, the hatch 5 is raised an amount. The maximum height $H_5$ of the hatch 5 (relative to the top surface of the hatch 5) within an area $A_1$ that extends vertically above this width $W_{115}$ occurs at position $P_{max}$.

In some embodiments, the ratio of the maximum height $H_5$ of the hatch 5 within an area that extends vertically above width $W_{115}$ of the opening 115 to the width $W_5$ of the hatch 5 ($H_5$ to $W_5$) is less than about 0.33, less than about 0.25 or even less than about 0.20.

Referring now to FIG. 14, in the fully open position, the hatch 5 forms an angle λ with a horizontal plane H to allow the hatch to act as a splash guard to direct liquid and solids toward the holding tank 15 (FIG. 2). In some embodiments, the angle λ is at least about 60°, at least about 70° or at least about 75° (e.g., from about 60° to about 90° or from about 70° to about 90°). In the illustrated embodiment, as the hatch moves vertically to the open positon, the hatch 5 is bound within a second area $A_2$ that extends outward (i.e., to the right as shown if FIG. 18) from a theoretical line L that extends upward from $P_{max}$ at an angle corresponding to angle λ.

The system 3 includes first and second dumping station sidewalls 105, 107 (FIG. 2) which are orthogonal to the hatch 5 in the open position. The sidewalls 105, 107 also act as hatch 5 and sidewalls 105, 107 provide a three sided splash barrier with a partial fourth side formed by the transport vehicle. Material may also be dumped into the holding tank 15 without the hatch 5 being fully open.

The transfer system 3 includes a conveyor 21 (FIG. 2) configured for removing material from the holding tank 15, vertically upward through a leg portion 23 of the conveyor 21, and through the outlet 45. The conveyor 21 extends into the holding tank 15 to remove the slurry from the tank 15 and move material to the discharge end 13 of the conveyer 21. In the illustrated embodiment, the conveyor 21 is a drag-slat conveyor that lifts and conveys material (e.g., slurry) forward. Drag-slat conveyors use a number of slats 31 (which may also be referred to as "bars" or "flights") to drag slurry along the floor 35 (FIG. 7) of the holding tank 15 and up the floor (FIG. 2) of the conveyor 21. The slats 31 drag material along the floor 25 (FIG. 7) of the holding tank 15 and along the floor 47 of the leg portion 23 of the conveyor 21. In the illustrated embodiments, the drag-slat conveyor 21 and holding tank 15 are part of the same unit, i.e., are integrally connected.

Referring now to FIG. 5, the conveyor 21 includes a top course 25A in which slats 31 are returned to the holding tank 15 and a bottom course 25B in which the slats 31 remove material from the bottom of the holding tank 15 and up the conveyor leg 23. Both courses 25A, 25B are disposed within the tank 15. Both courses are disposed below at least a portion of each frame members 32 and between a gap 43 (FIG. 87) between the first and second legs 50, 52 of the frame members 32. The conveyor 21 includes two chains (one chain 33 being shown in FIG. 5) with the slats 31 connected to and disposed between the chains 33.

Each chain 33 rides on a rail 53 within the holding tank 15. The chains 33 are driven by drive sprockets 38 which are powered by a motor 41 (FIG. 2). The conveyor 21 also includes head sprockets 39 and idler sprockets 60. A scraper 30 in the leg portion 23 of the conveyor 21 scrapes material from the top surface of the slats 31 to meter the amount of material carried by the conveyor 21.

As shown in FIG. 1, the conveyor 21 is angled to move the material vertically (relative to vertical axis B) and horizontally (relative to longitudinal axis A) toward a discharge end 13 of the conveyor 21. In this arrangement, the transfer system 3 collects material from one or more vehicles and elevates the material to outlet 45 for further processing (e.g., earthen slurry treatment such as dewatering and/or mixing of additives for slurry hardening).

Figure 19:
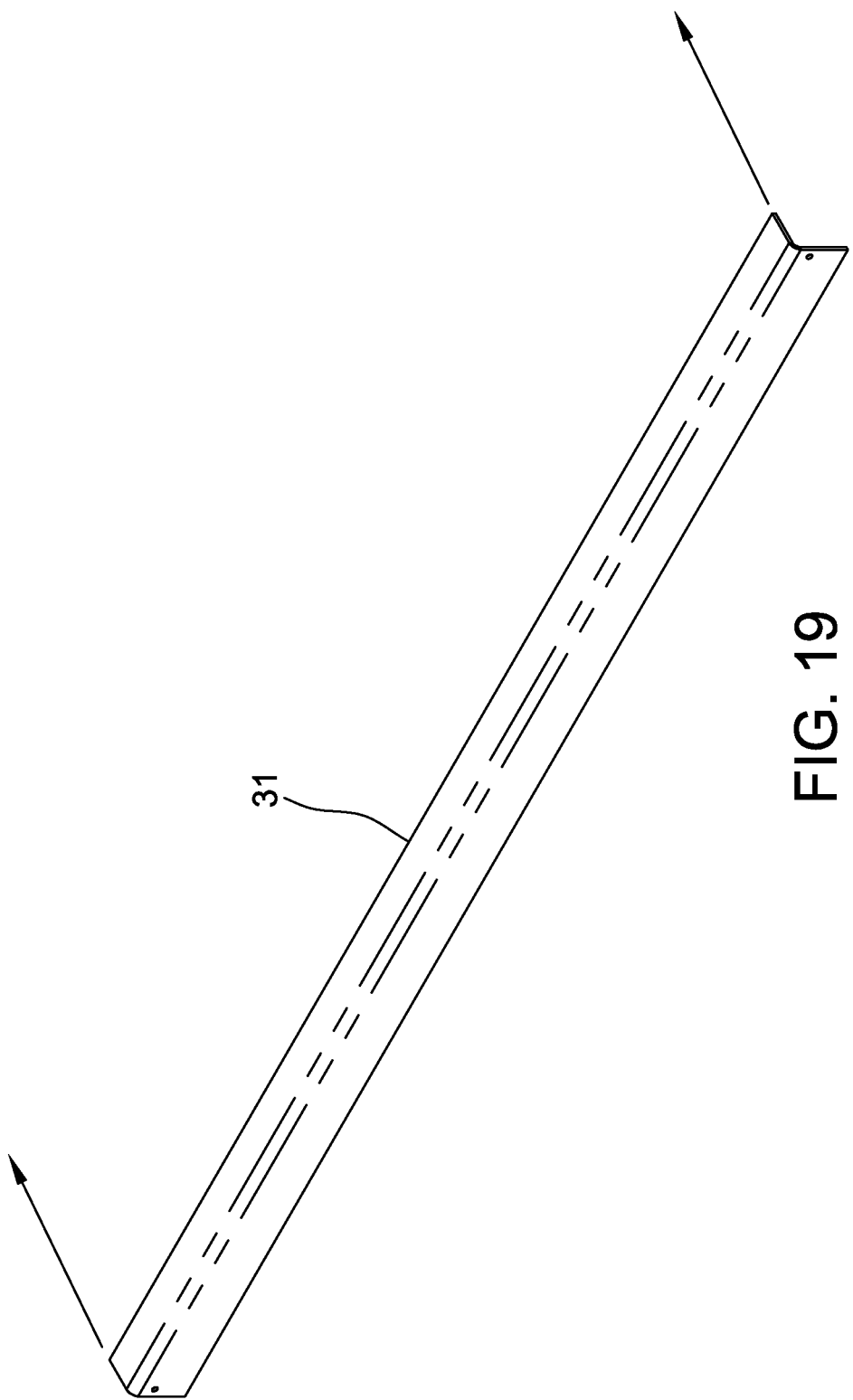
FIG. 19 is a perspective view of a slat of a conveyor for removing material from the holding tank.
Figure 20:
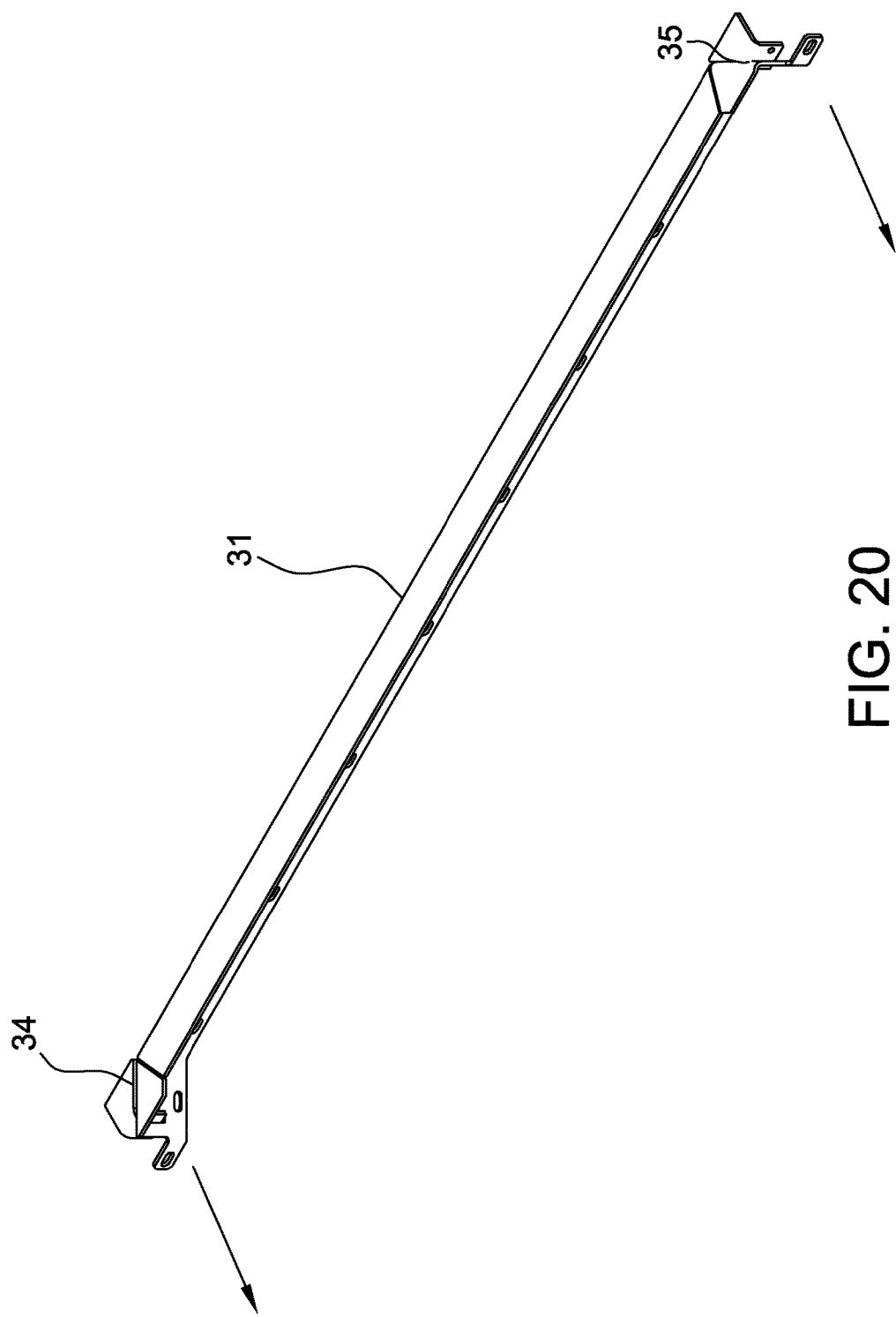
FIG. 20 is another embodiment of the slat having flare-out portions to cup material.

In some embodiments and as shown in FIG. 19 (the direction of travel of the slat on the lower course which pushes material forward shown by arrows), the slats 31 may have a vertical leg and a horizontal leg that provides rigidity to the slats 31. In some embodiments, the ends 34, 35 (FIG. 20) of the slats 31 are angled forward relative to the direction of travel of the slats on the bottom course to form flare-out portions that "cup" slurry to push slurry forward. The slats 31 may be flexible or include flexible portions (e.g., rubber or other soft material liner) to allow them to seal and scrape the floor of the holding tank 15 and conveyer 21 to better propel material forward. In some embodiments, some slats are flexible (e.g., include a flexible wiper) such as about every other slat or less, every third slat or less, every fifth slat or less, or even every tenth slat or less.

The transfer system 3 includes a discharge chute 6 (FIG. 3) positioned at a discharge end 13 of the drag-slat conveyor 21 to discharge material through outlet 45. In other embodiments, the system 3 may include a discharge auger (not shown) that aggregates material together from conveyor 21 into one or more outlets.

In some embodiments, the transfer system 3 is mobile which allows it to be transferred to different sites. The system 3 may include skids 94 (FIG. 2), rollers (not shown), wheels, or legs which may be vertically extended (not shown) to allow the system to be pulled or lifted onto a transport vehicle (e.g., trailer). In other embodiments, the system 3 includes ground-engaging wheels (or even tracks) for moving the system 3 (e.g., the system 3 itself is a trailer). The system 3 (e.g., dumping station 2 and conveyor 21) may be connected by a common frame to allow for ease of transport and/or provide greater stability when assembled.

The width of the system (e.g., width W of holding tank 15 as shown in FIG. 6) may be less than a legal width (e.g., 102 inches) at which the system may be moved by highway transport.

To transfer material (e.g., earthen slurry) on the system 3, a vehicle drives over the drive-over surface 8 (FIG. 1) formed by the hatch 5 and grate 18. If the material is relatively flowable (e.g., solids content of 25% or less), the doors 12 within the hatch 5 may be opened (FIG. 4) to receive material there-through (e.g., by opening a valve of the excavator to discharge material). In embodiments in which higher solid content material (e.g., greater than 25% solids) is dumped, an initial liquid may be discharged from the vehicle through the doors 12. The actuators 67, 68 may then be extended to move the hatch 5 from the closed position (FIG. 1) to the open position (FIG. 2). The remaining solids in the tank may be discharged by tipping the spoils tank T of the vehicle as shown in FIG. 18 to allow materials to fall through the opening 115 (FIG. 17). Alternatively, the operator may discharge all liquids and solids without use of doors 12 by moving the hatch 5 to the open position and dumping all material through the tank opening 115.

In some instances, material may cling to the spoils tank T (FIG. 18) even when fully tipped. In such embodiments, the operator may move the hatch 5 down to the closed position. The operator may then walk onto the drive-over surface 18 (FIG. 1) of the dumping station 2, open doors 12, and spray water into the spoils tank T to discharge the remaining solids through doors 12.

The conveyor 21 may be operated continually or intermittently such as after a series of vehicles has dumped material into the holding tank 15. The conveyor 21 may operate while material is dumped (e.g., while the hatch 5 is in a raised position) or may be configured to not be capable of operating while dumping material.

Compared to conventional transfer systems, the transfer systems described herein have several advantages. The moveable hatch may enable generally unrestricted flow of material into the holding tank. The hatch also allows transport vehicles to move to the dumping position by driving over the hatch without having to reverse. Doors disposed within the hatch allow the holding tank to be accessible when the hatch is in the closed position to allow the transport vehicle to be cleaned by spraying or the like. Dumping station sidewalls and the hatch act as splash guards which allow material to be dumped relatively quickly. Use of a relatively large holding tank allows all transport vehicle materials to be dumped at once.

In embodiments in which a drag-slat conveyor is used, the drag-slat conveyor allows the slurry to be removed on a continuous basis and lifted rather than being "dumped" from the holding tank. The drag-slat conveyor scrapes the bottom of the holding tank which allows it to be self-cleaning. This allows material to be removed even if solids have settled in the tank. Drag slat conveyors also mix the material less which promotes downstream separation of the materials (e.g., dewatering).

Using a relatively compact system allows the system to be mobile (e.g., through skids, rollers or wheels) which allows the system to be transported to different sites to, for example, locate the system at an accessible, central site between drill sites. The dumping station includes frame members that form drive-on frames to support both sides of a vehicle as the vehicle drives over the dumping station hatch. The frame members allow the conveyor to pass under the frame members to remove material from the holding tank. The actuator assemblies that move the hatch from the closed to the open position may be arranged to initially move the hatch in a horizontal direction to allow the hatch to clear the vacuum excavator and provide additional room for the vacuum excavator to be reversed.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A transfer system for receiving and conveying material from transport vehicles comprising:
   a holding tank;
   a hatch movable between a closed position in which a holding tank opening is covered and an open position in which the holding tank opening is uncovered, the hatch having a drive-over surface;
   one or more frame members that extend across the holding tank opening to support vehicles that move across the drive-over surface, the hatch being disposed above the one or more frame members; and
   a conveyor that extends into the holding tank to remove material from the holding tank, the conveyor having a top course and a bottom course, the conveyor top course and bottom course being disposed below the frame member.

2. The transfer system a set forth in claim 1 wherein the conveyor is a drag-slat conveyor.

3. The transfer system as set forth in claim 1 wherein the conveyor comprises a leg portion to move material upward relative to a vertical axis of the transfer system.

4. The transfer system as set forth in claim 1 wherein the hatch forms an angle with a horizontal plane in the open position, the angle being at least about 60°.

5. The transfer system as set forth in claim 1 wherein the hatch forms an angle with a horizontal plane in the open position, the angle being at least about 70°.

6. The transfer system as set forth in claim 1 wherein the hatch includes doors that are moveable to an open position to uncover a portion of the tank opening when the hatch is in the closed position.

7. A dumping station for receiving material from a transport vehicle, the dumping station comprising:
   a holding tank for receiving material discharged from a transport vehicle, the holding tank having a first sidewall and a second sidewall, the holding tank having a longitudinal axis generally parallel to the first and second sidewalls;
   a hatch having a drive-over surface disposed above the holding tank;
   a first frame member for supporting transport vehicles which move across the drive-over surface, the frame member being orthogonal to the longitudinal axis; and
   a second frame member for supporting transport vehicles which travel over the drive-over surface, the second frame member being orthogonal to the longitudinal axis, the hatch being disposed above the first and second frame members.

8. The dumping station as set forth in claim 7 further wherein the first and second frame members form a first drive-on frame to support a transport vehicle as a first wheel moves across the drive-over surface, the dumping station further comprising:
   a third frame member for supporting transport vehicles which travel over the drive-over surface, the third frame member being orthogonal to the longitudinal axis; and
   a fourth frame member for supporting transport vehicles which travel over the drive-over surface, the fourth frame member being orthogonal to the longitudinal axis, the third and fourth frame members forming a second drive-on frame to support a transport vehicle as a second wheel moves across the drive-over surface.

9. The dumping station as set forth in claim 8 wherein the first, second, third and fourth frame members support the hatch.

10. The dumping station as set forth in claim 7 wherein each frame member includes:
    a first external portion that is disposed outside of the holding tank;
    a second external portion that is disposed outside of the holding tank, the second external portion being across from the first external portion relative to the longitudinal axis; and
    an internal portion disposed in the holding tank.

11. The dumping station as set forth in claim 10 wherein the first sidewall of the holding tank is connected to the first external portion and the second sidewall of the holding tank is connected to the second external portion.

12. The dumping station as set forth in claim 7 wherein each frame member includes:
    a first leg;
    a second leg; and
    a spanning portion that is disposed between the first leg and second leg, the spanning portion extending across at least a portion of a top width of the holding tank, the top width extending between the first and second holding tank sidewalls.

13. The dumping station as set forth in claim 7 wherein the holding tank has a first end and a second end, the longitudinal axis extending through the first end and second end, the dumping station further comprising a conveyor that extends into the holding tank to remove material from the holding tank through the second end.

14. A dumping station for receiving material from a transport vehicle, the dumping station having a longitudinal axis, the dumping station comprising:
    a holding tank;
    a hatch movable between a closed position in which a holding tank opening is covered and an open position in which the holding tank opening is uncovered;
    an actuator assembly for moving the hatch between the open position and the closed position; and
    a frame comprising:
      a first mount system for connecting the actuator assembly, the hatch moving in a first direction as it moves from the closed position to the open position when the actuator assembly is connected to the first mount system, the first direction being transverse to the longitudinal axis; and
      a second mount system for connecting the actuator assembly, the hatch moving in a second direction as it moves from the closed position to the open position when the actuator assembly is connected to the second mount system, the second direction being transverse to the longitudinal axis.

15. The dumping station as set forth in claim 14 wherein the actuator assembly comprises a link and an actuator, the first mount system comprising first and second mounting members for connecting to the link and/or the actuator of the actuator assembly, the second mount system comprising first and second mounting members for connecting to the link and/or actuator of the actuator assembly.

16. The dumping station as set forth in claim 15 wherein the first mount system comprises a third mounting member for connecting a link of the actuator assembly and the second mount system comprises a third mounting member for connecting to a link of the actuator assembly.

17. The dumping station as set forth in claim 14 wherein the actuator assembly is a first actuator assembly and the frame is a first frame, the dumping station further comprising:
    a second actuator assembly for moving the hatch between the open position and the closed position; and
    a second frame comprising:
      a first mount system for connecting the actuator assembly, the hatch moving in Hall the first direction as it moves from the closed position to the open position when the actuator assembly is connected to the first mount system, the first direction being transverse to the longitudinal axis; and
      a second mount system for connecting the actuator assembly, the hatch moving in the second direction as it moves from the closed position to the open position when the actuator assembly is connected to the second mount system, the second direction being transverse to the longitudinal axis.

18. A dumping station for receiving material from a transport vehicle, the dumping station comprising:
    a holding tank;
    a hatch having a width, the hatch being movable between a closed position in which a holding tank opening is covered and an open position in which the holding tank opening is uncovered, the holding tank opening having a width created when the hatch is in the open position, the hatch moving within an area that extends vertically above the width of the holding tank opening as the hatch moves from the open position to the closed position, the area having a maximum height, a ratio of the maximum height of the area to the width of the hatch being less than about 0.33; and an actuator assembly for moving the hatch between the open position and the closed position.

19. The dumping station as set forth in claim 18 wherein the ratio of the maximum height of the area to the width of the hatch is less than about 0.25.

20. The dumping station as set forth in claim 18 wherein the ratio of the maximum height of the area to the width of the hatch is less than about 0.20.

21. The dumping station as set forth in claim 18 wherein the hatch forms an angle with a horizontal plane in the open position, the angle being at least about 60°.

22. The dumping station as set forth in claim 18 wherein the hatch forms an angle with a horizontal plane in the open position, the angle being at least about 70°.

* * * * *